United States Patent
He et al.

(10) Patent No.: US 12,402,558 B2
(45) Date of Patent: Sep. 2, 2025

(54) TRIMMER HEAD AND TRIMMER THEREOF

(71) Applicant: ZHEJIANG SUNSEEKER INDUSTRIAL CO., LTD., Zhejiang (CN)

(72) Inventors: Kefeng He, Zhejiang (CN); Zhuangzhuang He, Zhejiang (CN); Caifen He, Zhejiang (CN); Haiwei Wang, Zhejiang (CN); Yinhua Cheng, Zhejiang (CN)

(73) Assignee: ZHEJIANG SUNSEEKER INDUSTRIAL CO., LTD., Zhejiang (CN)

( * ) Notice: Subject to any disclaimer, the term of this patent is extended or adjusted under 35 U.S.C. 154(b) by 185 days.

(21) Appl. No.: 17/988,312

(22) Filed: Nov. 16, 2022

(65) Prior Publication Data
US 2023/0157206 A1    May 25, 2023

(51) Int. Cl.
*A01D 34/416* (2006.01)

(52) U.S. Cl.
CPC ..... *A01D 34/4165* (2013.01); *A01D 34/4168* (2013.01)

(58) Field of Classification Search
None
See application file for complete search history.

(56) References Cited

U.S. PATENT DOCUMENTS

| | | | |
|---|---|---|---|
| 2002/0029483 A1* | 3/2002 | Price | A01D 34/736 30/276 |
| 2008/0010836 A1* | 1/2008 | Lacona | A01D 42/005 30/122 |
| 2010/0083506 A1* | 4/2010 | Bennett | A01D 34/4168 30/122 |
| 2014/0150267 A1* | 6/2014 | Sowell | A01D 34/84 30/340 |
| 2020/0000025 A1* | 1/2020 | Morabit | A01D 34/4165 |
| 2023/0157206 A1* | 5/2023 | He | A01D 34/4165 30/276 |

* cited by examiner

*Primary Examiner* — Hwei-Siu C Payer
(74) *Attorney, Agent, or Firm* — KARCESKI IP LAW, PLLC

(57) ABSTRACT

A trimmer and a trimmer head include an upper cover assembly being connected to and driven by a motor, wherein the upper cover assembly is configured to be removably connected to at least one of a first trimming assembly or a second trimming assembly selectively, and is provided with at least one connection hole in its side wall; the first trimming assembly is configured to include a first lower cover, a first cutting member, and a first base; the second trimming assembly is configured to include a second lower cover, a second cutting member, and a second base; wherein the first base is at least partially inserted into the connection hole when the first trimming assembly is mounted, and the second lower cover is at least partially inserted into the connection hole when the second trimming assembly is mounted.

20 Claims, 4 Drawing Sheets

TRIMMER HEAD AND TRIMMER THEREOF

CROSS-REFERENCE TO RELATED APPLICATION(S)

This application relies on and claims priority to the following applications: Chinese Patent Application No. CN2021229092651, filed on Nov. 19, 2021 (published as CN217116927U), and Chinese Patent Application No. CN2021228569659, filed on Nov. 19, 2021 (published as CN217509420U), the entire contents of both of which are incorporated herein by reference.

TECHNICAL FIELD

The embodiments of the disclosure refer generally to garden tools, and more specifically to a trimmer head and a trimmer thereof.

BACKGROUND

There are not many kinds of trimmer heads on the market with interchangeable string and blades. One of the main reasons is that the prior art needs to make a big change in the structure when designing two different kinds of trimming assembly of string and blades to one trimmer head. Especially for the string trimmer, the connection position of the trimming line is raised from the middle of the lower cover to the upper edge of the lower cover. In this way the distance between the trimming line and the lawn ground increases, which reduces the trimming efficiency and makes it more difficult to control the flatness of the lawn.

On the other hand, in prior arts for the blade trimmer, the blade is mounted on the lower housing through the plug-in connector. In the actual trimming operation, when the blade encounters a hard object, the force on the blade is directly transferred to the lower housing. It is difficult to separately strengthen the stressed position of the lower housing as molded in one piece and easy to damage. Therefore, the whole lower housing needs to be replaced when damaged.

SUMMARY

As will be disclosed in detail in the description, the inventors have realized that the traditional trimmer head brings about at least two problems. It is therefore an object of the teachings of this application to overcome or at least reduce those problems.

According to one aspect there is provided a trimmer head which enables for a high-efficient trimming comprising an upper cover assembly being connected to and driven by a motor, wherein the upper cover assembly is configured to be removably connected to a first trimming assembly or a second trimming assembly selectively, and is provided with at least one connection hole in its side wall; the first trimming assembly is configured to include a first lower cover, a first cutting member and a first base; the second trimming assembly is configured to include a second lower cover, a second cutting member and a second base; wherein the first base is at least partially inserted into the connection hole when the first trimming assembly is mounted, and the second lower cover is at least partially inserted into the connection hole when the second trimming assembly is mounted.

BRIEF DESCRIPTION OF DRAWINGS

The embodiments of the disclosure will be described in further detail under reference to the accompanying drawings in which.

DESCRIPTION OF EMBODIMENTS

Figure 1:
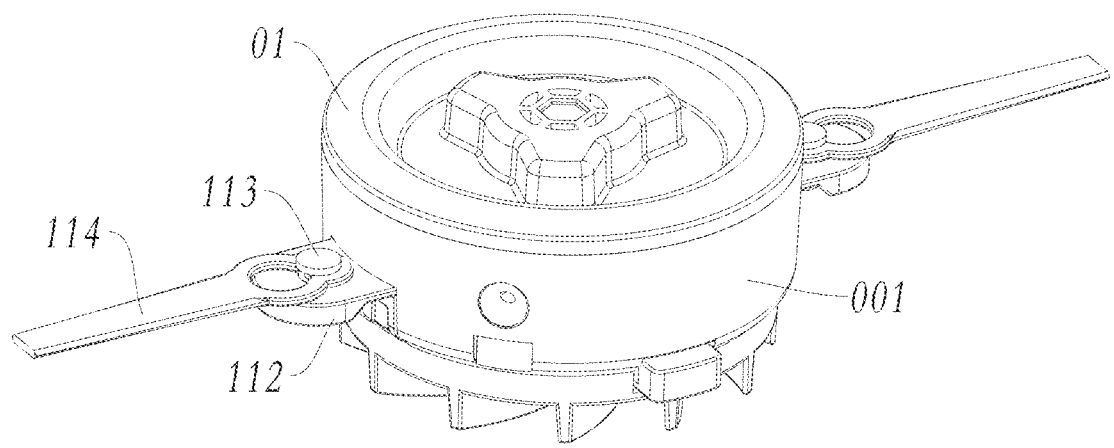
FIG. 1 is a perspective view of the trimmer head of an embodiment of the disclosure with the first trimming assembly mounted, with the side facing upward in the figure facing downward during operation.

The following description is made for the purpose of illustrating the general principles of the present trimmer head and trimmer, and is not meant to limit the inventive concepts claimed in this document. Further, particular features described in this document can be used in combination with other described features in each of the various possible combinations and permutations.

Unless otherwise specifically defined in this document, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a", "an" and "the" include plural referents unless otherwise specified. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to". Additionally, use the term "couple", "coupled", or "coupled to" may imply that two or more elements may be directly connected or may be indirectly coupled through one or more intervening elements.

In this document, position-identifying terms such as "vertical", "horizontal", "front", "rear", "top", and "bottom" are not intended to limit the invention to a particular direction or orientation, but instead are only intended to denote relative positions, or positions corresponding to directions shown when a structure or product is oriented as shown in the Figures.

Referring to FIGS. 1, 3, 5, 7 and 8, an embodiment shows a trimmer head comprising an upper cover assembly 001 being connected to and driven by a motor, wherein the upper cover assembly 001 is configured to be removably connected to a first trimming assembly 100 or a second trimming assembly 200 selectively, and is provided with at least one connection hole 003 in its side wall. In this embodiment, a connection hole 003 is symmetrically provided on both walls of the upper cover assembly 001 along the bottom center line.

The first trimming assembly 100 is configured to include a first lower cover 01, a first cutting member and a first base 111. In this embodiment, the first base 111 is connected to the upper cover assembly 001 when the first trimming assembly 100 is mounted. The first base 111 is configured to include a first fixing part 12 that is at least partially inserted into the connection hole 003 when the first trimming assembly 100 is mounted.

Figure 3:
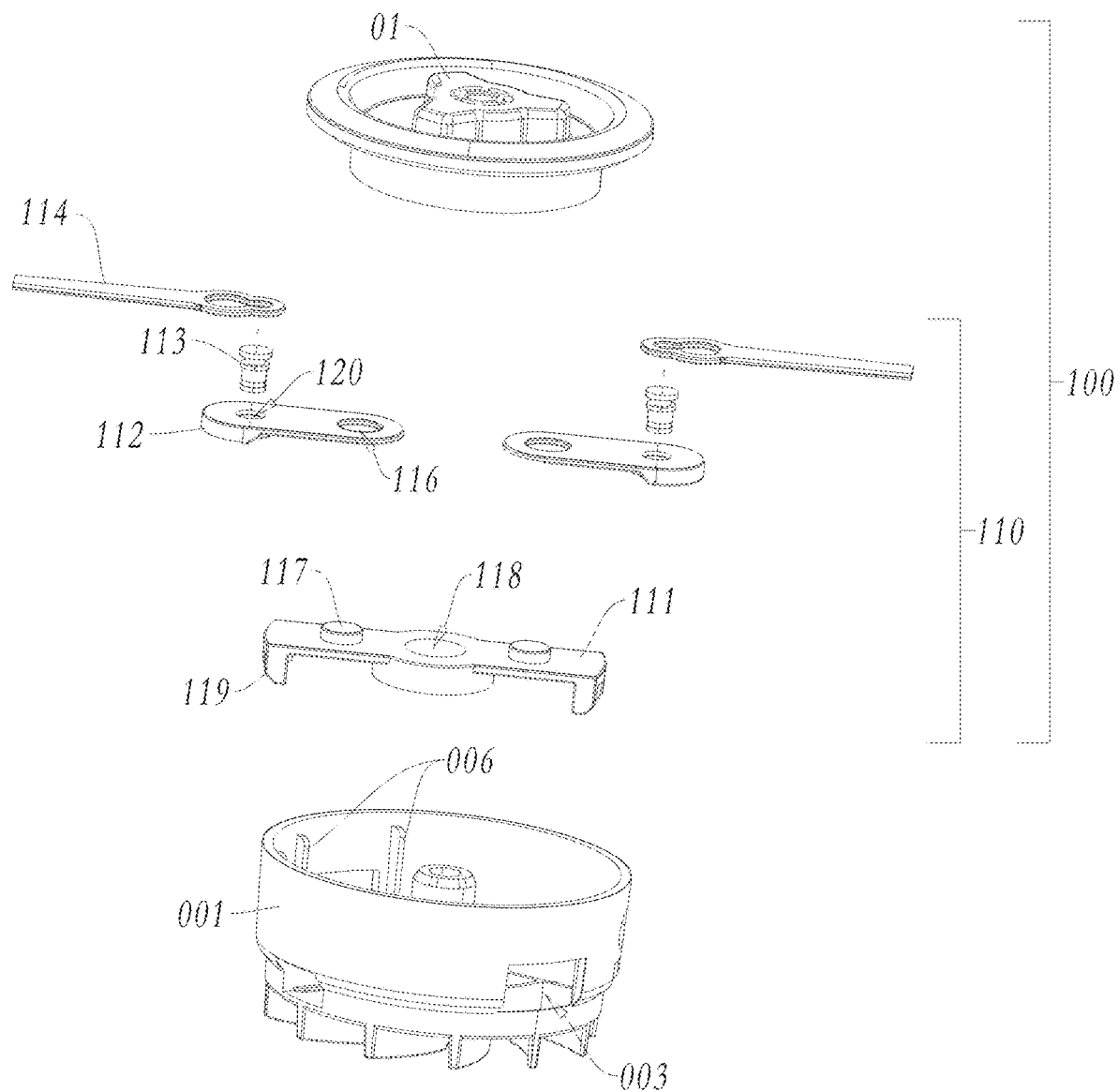
FIG. 3 is a exploded perspective view of the trimmer head of an embodiment of the disclosure with the first trimming assembly mounted, with the side facing upward in the figure facing downward during operation.
Figure 5:
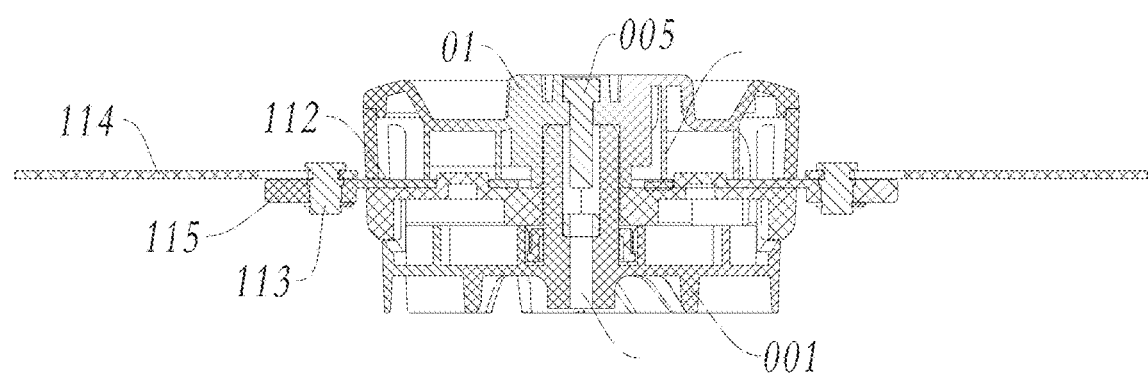
FIG. 5 is a cross-sectional view of the trimmer head of an embodiment of the disclosure with the first trimming assembly mounted, with the side facing upward in the figure facing downward during operation.

Referring to FIGS. 3 and 5, the first lower cover 01 is removably assembled with the upper cover assembly 001 by a fastener 005 when the first trimming assembly 100 is mounted in the upper cover assembly 001. In this embodiment, the fastener 005 is configured as a bolt. The upper cover assembly 001 has a raised pillar 101 in the bottom center and the pillar 101 is provided with a threaded hole 102 in the center. The first base 111 is set on the outer surface of the pillar 101, and the first lower cover 01 is mounted at the threaded hole 102 by the bolt.

Figure 7:
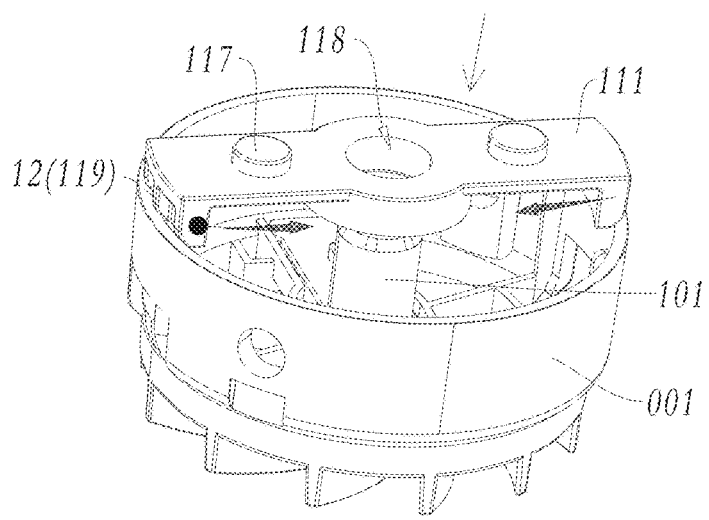
FIG. 7 is a perspective view of the upper cover of an embodiment of the disclosure when it is assembled with the first base.
Figure 8:
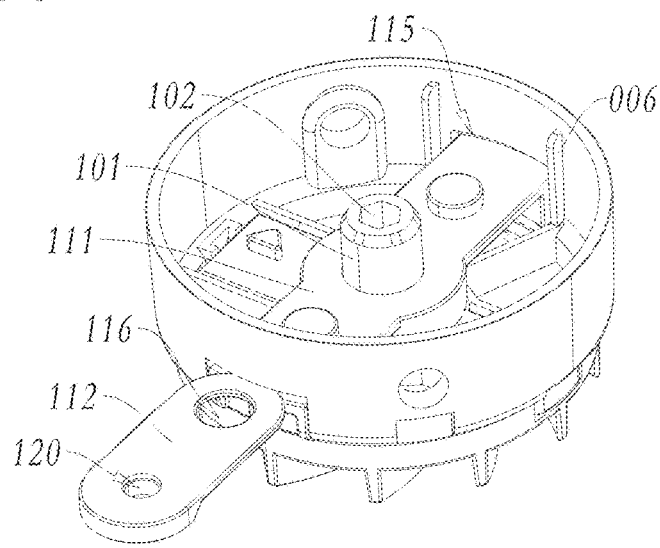
FIG. 8 is a perspective view of the mounting status of the holder into the upper cover and the first base of an embodiment of the disclosure.

Referring to FIG. 3, the first cutting member and the first base 111 are clamped to the first lower cover 01 by the upper cover assembly 001. The first base 111 is configured to be made of a hard material with a certain elasticity and is further configured as an oblong plate with a round projection in the center, and the projection is provided with a first connection part 118 adapted to the outer surface of the pillar 101. Each end of the first base 111 is provided with a first extension part 119 with the same cross-section as the connection hole 003 and facing the same side of the plate. In this embodiment, the extending direction of the first extension part 119 is generally perpendicular to the extending direction of the first base 111. The plate surface opposite the round projection is provided with a second connection part 117 provided symmetrically about the first connection part 118. In this embodiment, the first connection part 118 is configured as a hole adapted to the pillar 101, and the second connection part 117 is configured to include at least one projection. Both of the first extension parts 119 corresponding to the connection holes 003 are extruded inward from the opening side of the upper cover assembly 001. A first fixing part 12 is provided on the outer side of the end of the first extension part 119 to make it easy to mount at the initial stage. By extruding the first base 111, the first fixing part 12 is conflict with the inner wall around the corresponding connection hole 003. By continuing to apply the extrusion force, the first base 111 produces elastic deformation. Referring to FIG. 7, the conflict between the two disappears until the first base 111 is pushed into the connection hole 003, then the first base 111 returns to the initial state. A clearance 115 used to mount the first cutting member is on the side of the connection hole 003 towards the second connection part 117 when mounted.

The first cutting member includes a holder 112 and a blade 114. The holder 112 is configured to be removably connected to the first base 111. In this embodiment, the blade 114 is configured to be movably connected to the holder 112 by a connector 113. In other embodiments, the blade 114 may also be configured to be integrally formed with the holder 112. One end of the holder 112 passes through the connection hole 003 into the upper cover assembly 001 and is connected to the first base, and the other end of the holder 112 is mounted with a blade 114. The holder 112 is configured as an oblong plate with a width the same as or slightly smaller than the connection hole 003. One end of the plate surface is provided with a third connection part 116 adapted to the second connection part 117, and the other end of the plate surface is thickened and is provided with a fourth connection part 120 with the connector 113. The end of the third connection part 116 of the holder 112 passes through the clearance 115 and the third connection part 116 is connected to the second connection part 117. The other end of the holder 112 is exposed outside the upper cover assembly 001. The bottom of the first lower cover 01 is pressed against the holder 112, so that the upper and lower positions of the holder 112 are limited. At the same time, the position of the holder 112 on both sides has been limited by the connection hole 003 in the upper cover assembly 001, so the position of the holder 112 is completely limited, so that the blade 114 on the holder 112 can be positioned by the connector 113. In this embodiment, the first trimming assembly 100 includes two blades 114. In other embodiments, the number of blades can also be one, three, four, etc., just by changing the number of the corresponding connection holes 003 and making corresponding adjustments to the number and the structure of the adapting parts in the holder assembly 110. In this embodiment, the second connection part 117 is configured as a projection and the third connection part 116 is configured as a hole adapted to the projection. In other embodiments, the third connection part 116 is configured as a projection and the second connection part 117 is configured as a hole adapted to the projection.

Referring to FIG. 7, when mounting the first trimming assembly 100, firstly to place the opening of the upper cover 001 upward, and then to place the first base 111 into the upper cover 001 with the first connection part 118 corresponding to the pillar 101, and the first base 111 is pressed to touch the bottom of the upper cover 001. At this time, the two first extension parts 119 are inserted into the corresponding connection holes 003. Then the holder 112 passes through the clearance 115 from the outside and is inserted by the second connection part 117 referring to FIG. 8. The thickened end of the plate surface of the holder 112 is exposed to the outer wall of the upper cover 001. The first lower cover 01 is connected to the upper cover 001 by the fastener 005. After the connection, at least one rib of the first lower cover 01 presses against the holder 112, and the first base 111 and the holder 112 are pressed together at the bottom of the upper cover assembly 001. The holder 112 has been limited to both sides by a connection hole before, so the position of the holder 112 is completely limited by pressing. Finally, the blade 114 is mounted on the holder 112 through the connector 113, and all connections are completed since then. In some embodiments, the blade 114 and the holder 112 may be pre-mounted together. In other embodiments, the holder 112, the connector 113, and the blade 114 may be sold and used as an assembly.

Figure 2:
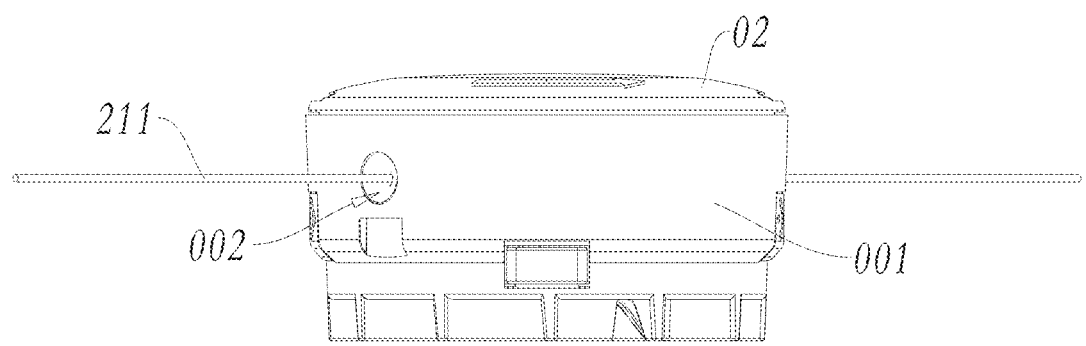
FIG. 2 is a perspective view of the trimmer head of an embodiment of the disclosure with the second trimming assembly mounted, with the side facing upward in the figure facing downward during operation.
Figure 4:
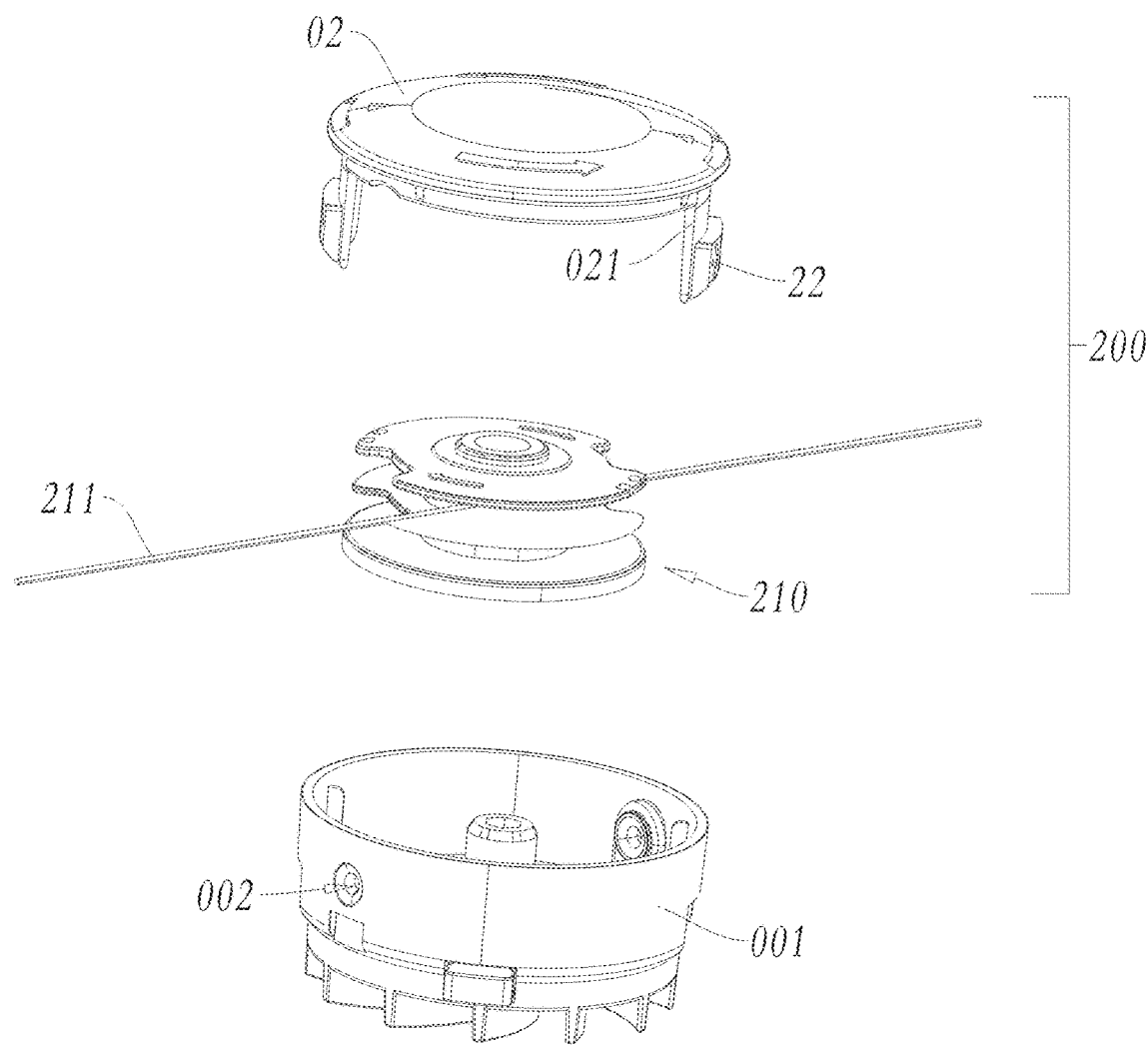
FIG. 4 is a exploded perspective view of the trimmer head of an embodiment of the disclosure with the second trimming assembly mounted, with the side facing upward in the figure facing downward during operation.
Figure 6:
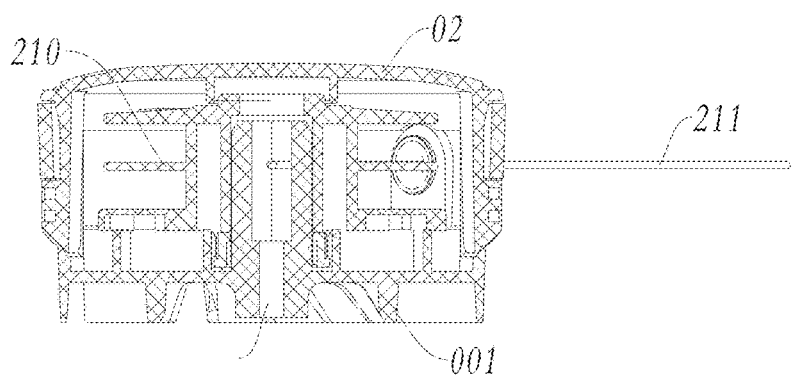
FIG. 6 is a cross-sectional view of the trimmer head of an embodiment of the disclosure with the second trimming assembly mounted, with the side facing upward in the figure facing downward during operation.

Referring to FIGS. 2, 4 and 6, a trimming head is disclosed and includes an upper cover assembly 001 and a second trimming assembly. The second trimming assembly 200 is configured to include a second lower cover 02, a second cutting member, and a second base 210. In this embodiment, the second base 210 is movably connected to the upper cover assembly 001 when the second trimming assembly 200 is mounted. The second lower cover 02 includes a second fixing part which is at least partially inserted into the connection hole 003 when the second trimming assembly 200 is mounted. The connection hole 003 provides space for the second fixing part 22 in the second lower cover 02 to engage when the second trimming assembly 200 is used.

Referring to FIG. 4, the second lower cover 02 is configured to include at least one second extension part 021 being configured to be generally perpendicular to the second lower cover 02; the second fixing part 22 is configured to be provided on the outside of the end of the second extension part 021 away from the second lower cover 02. The second fixing part 22 is inserted into the connection hole 003 to engage when the second lower cover 02 is assembled with the upper cover assembly 001. In this embodiment, two second extension parts 021 are provided on the second lower cover 02 symmetrically about the center axis of rotation.

The second trimming assembly 200 is provided with at least one trimming line 211. In this embodiment, the trimming line is wound on a wire reel with at least one end extending from the wire reel and extending out of the upper cover assembly 001. Further, in this embodiment, the both ends of the trimming line extend from the wire reel and extend out of the upper cover assembly 001. The side wall of the upper cover assembly 001 is provided with an opening 002 for the trimming line 211 to pass through. The opening 002 is used to limit the position of the trimming line 211. Referring to FIG. 4, the second base 210 is configured to include a wire reel, and the second lower cover 02 is covered outside the second base 210, which surrounds the second base 210 as a whole.

Further, two longitudinal ribs 006 are provided along the inner side wall on both sides of the connection hole 003 to strengthen the connection hole 003, and also to guide the first base 111 or the second lower cover 02 when mounting.

The first lower cover 01, the first base 111, the holder 112, the connector 113 and the blade 114 involved in the first trimming assembly 100 are removed in the opposite order of mounting when replacing the first trimming assembly 100 with the second trimming assembly 200; in some embodiments, the holder 112, the connector 113 and the blade 114 are used as an assembly which can be removed as a whole. Then, the second base 210 is mounted into the upper cover assembly 001, and then the second fixing part 22 on the second lower cover 02 is pressed downward against the position of the connection hole 003. The two longitudinal ribs provided on both sides of the connection hole 003 are used to guide the second fixing part 22. The second lower cover 02 is provided with elastic material, which makes the second fixing part 22 have better elastic restoration ability. The second fixing part 22 is deformed by pressure and bends or shrinks inward when the second fixing part 22 enters the inner wall of the second lower cover 02. The second fixing part 22 is inserted into the connection hole 003 and returns to its original statues, and then the mounting is completed.

An embodiment also discloses a trimmer including the above mentioned trimmer head.

The upper cover assembly 001 is designed to be used in two modes, so the connection hole 003 in the side wall of the upper cover assembly 001 plays different roles in different modes. The connection hole 003 provides the mounting area for the first trimming assembly 100 when using the blade trimming mode; the connection hole 003 provides space for the second fixing part 22 in the second lower cover 02 to engage when using the second trimming assembly 200. On the one hand, with the above-mentioned embodiments of the trimming head, only need to replace the blade and string components and the corresponding lower cover accordingly when the type of the cutting member need to be changed, and the upper cover assembly as the largest volume part is shared. In this way, the components that need to be replaced in the two trimming modes are relatively independent and compact, so that the cost of manufacturing and maintenance replacement can be reduced accordingly. On the other hand, the trimming line of the second trimming assembly is provided in the middle position of the lower cover, thus solving the problem of low efficiency when cutting grass with the conventional trimmer head, and reducing the difficulty of controlling the flatness of the lawn. In addition, the overall structure shape of the upper cover is used to provide a connection hole in its side wall, and the first base and holder are mounted inside the upper cover. One end of the holder extends from the connection hole, and the first cutting member is mounted at the part of the holder extending from the connection hole, and the part is closely adapted to the width direction of the connection hole. The holder, the first base and the upper cover are in a fastened state after the lower cover is fixedly connected, that is, the holder and the first base are equivalent to a whole. When the blade is impacted during the cutting, the part where the blade is mounted is under a huge circumferential force, and the circumferential force is transferred to the holder and the first base and is absorbed by the connection part between the holder and the first base and the connection hole. And the holder and the first base clamped by the lower cover can also share the force of the connection part. So, the impact resistance can be greatly enhanced under the combination.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A trimmer head, comprising:
   an upper cover assembly being connected to and driven by a motor,
   wherein the upper cover assembly is configured to be removably connected to at least one of a first trimming assembly or a second trimming assembly different from the first trimming assembly selectively, and is provided with at least one connection hole in its side wall;
   the first trimming assembly is configured to include a first lower cover, a first cutting member, and a first base;
   the second trimming assembly is configured to include a second lower cover, a second cutting member, and a second base; and
   wherein the first base is at least partially inserted into the connection hole when the first trimming assembly is selectively mounted to the upper cover assembly, and the second lower cover is at least partially inserted into the connection hole when the second trimming assembly is selectively mounted to the upper cover assembly.

2. The trimmer head in accordance with claim 1, wherein the first base is connected to the upper cover assembly when the first trimming assembly is selectively mounted to the upper cover assembly.

3. The trimmer head in accordance with claim 1, wherein the second base is movably connected to the upper cover assembly when the second trimming assembly is selectively mounted to the upper cover assembly.

4. The trimmer head in accordance with claim 1, wherein the first cutting member passes at least partially through the connection hole when the first trimming assembly is mounted.

5. The trimmer head in accordance with claim 1, wherein the first base is configured to include a first fixing part, and the second lower cover is configured to include a second fixing part;
wherein the first fixing part is at least partially inserted into the connection hole when the first trimming assembly is selectively mounted to the upper cover assembly, and the second fixing part is at least partially inserted into the connection hole when the second trimming assembly is selectively mounted to the upper cover assembly.

6. The trimmer head in accordance with claim 5, wherein the first base is configured to include a first connection part and a second connection part;
the first connection part and the second connection part are configured to be spaced along an extending direction of the first base; and
the first connection part is configured to be removably connected to the upper cover assembly and the second connection part is configured to be removably connected to the first cutting member.

7. The trimmer head in accordance with claim 6, wherein the first base is provided with a first extension part at an end away from the first connection part, and an extending direction of the first extension part is generally perpendicular to the extending direction of the first base; and the first fixing part is disposed a greater radial distance from a rotational axis of the trimmer head than the first extension part.

8. The trimmer head in accordance with claim 6, wherein the first cutting member is configured to include a holder and a blade; and
wherein the holder passes at least partially through the connection hole when the first trimming assembly is selectively mounted to the upper cover assembly, and an end of the holder that is inside the upper cover assembly is removably connected to the first base.

9. The trimmer head in accordance with claim 8, wherein the holder is configured to include a third connection part and a fourth connection part; the third connection part is configured to be removably connected to the second connection part; and the fourth connection part is configured to be connected to the blade.

10. The trimmer head in accordance with claim 9, wherein the second connection part is configured to include at least one projection, and the third connection part is configured to include at least one hole adapted to the projection.

11. The trimmer head in accordance with claim 9, wherein the blade is configured to be movably connected to the fourth connection part.

12. The trimmer head in accordance with claim 8, wherein the holder is configured as an oblong plate with a width adapted to the connection hole.

13. The trimmer head in accordance with claim 8, wherein the thickness of the holder is adapted to a clearance that is between the first fixing part and the connection hole when the first base is selectively connected to the upper cover assembly.

14. The trimmer head in accordance with claim 8, wherein the bottom of the first lower cover abuts on the holder when the first trimming assembly is selectively mounted to the upper cover assembly.

15. The trimmer head in accordance with claim 8, wherein the first lower cover is provided with a rib; and the rib presses against the holder when the first trimming assembly is selectively mounted to the upper cover assembly.

16. The trimmer head in accordance with claim 6, wherein the upper cover assembly is configured to include a pillar; and the first connection part is configured as a hole adapted to the pillar.

17. The trimmer head in accordance with claim 5, wherein the second lower cover is configured to include a second extension part being configured to be generally perpendicular to the second lower cover; and the second fixing part is configured to be provided on the outside of the end of the second extension part away from the second lower cover.

18. The trimmer head in accordance with claim 1, wherein the second base is configured as a wire reel and the second cutting member is configured as a trimmer line; the upper cover assembly is provided with at least one opening in the side wall separate from the connection hole; and the trimmer line passes through the opening when the second trimming assembly is mounted.

19. The trimmer head in accordance with claim 1, wherein the first lower cover is selectively connected to the upper cover assembly by a fastener.

20. A trimmer comprising a trimmer head:
wherein the trimmer head comprises an upper cover assembly being connected to and driven by a motor,
wherein the upper cover assembly is configured to be removably connected to at least one of a first trimming assembly or a second trimming assembly different from the first trimming assembly selectively, and is provided with at least one connection hole in its side wall;
the first trimming assembly is configured to include a first lower cover, a first cutting member and a first base;
the second trimming assembly is configured to include a second lower cover, a second cutting member and a second base; and
wherein the first base is at least partially inserted into the connection hole when the first trimming assembly is selectively mounted to the upper cover assembly, and the second lower cover is at least partially inserted into the connection hole when the second trimming assembly is selectively mounted to the upper cover assembly.

* * * * *